(12) United States Patent
Paul et al.

(10) Patent No.: US 6,825,976 B2
(45) Date of Patent: Nov. 30, 2004

(54) ANTIREFLECTION COATING FOR ULTRAVIOLET LIGHT

(75) Inventors: Hans-Jochen Paul, Aalen (DE); Matthias Heller, Hohenahr (DE)

(73) Assignee: Carl Zeiss SMT AG, Oberkochen (DE)

( * ) Notice: Subject to any disclaimer, the term of this patent is extended or adjusted under 35 U.S.C. 154(b) by 0 days.

(21) Appl. No.: 10/036,536

(22) Filed: Jan. 7, 2002

(65) Prior Publication Data

US 2002/0105721 A1 Aug. 8, 2002

(30) Foreign Application Priority Data

Jan. 5, 2001 (DE) .......................................... 101 01 017

(51) Int. Cl.[7] .................................................. G02B 5/20
(52) U.S. Cl. ...................................... 359/359; 359/350
(58) Field of Search ................................ 359/350, 359, 359/580, 581, 586, 587, 588, 589

(56) References Cited

U.S. PATENT DOCUMENTS

| | | | | |
|---|---|---|---|---|
| 4,735,488 A | * | 4/1988 | Rancourt et al. | 359/586 |
| 4,997,241 A | | 3/1991 | Muratomi | |
| 5,061,874 A | | 10/1991 | Hecq et al. | |
| 5,426,532 A | * | 6/1995 | Costich | 359/586 |
| 5,532,871 A | | 7/1996 | Hashimoto et al. | 359/359 |
| 5,604,629 A | * | 2/1997 | Hunter et al. | 359/359 |
| 5,728,456 A | * | 3/1998 | Adair et al. | 428/216 |
| 5,885,712 A | | 3/1999 | Otani et al. | 428/426 |
| 5,963,365 A | | 10/1999 | Shirai | 359/359 |
| 6,030,717 A | | 2/2000 | Nakamura et al. | |
| 6,066,401 A | | 5/2000 | Stilburn | |
| 6,396,626 B1 | * | 5/2002 | Otani et al. | 359/359 |
| 6,472,087 B1 | | 10/2002 | Otani et al. | 428/696 |

FOREIGN PATENT DOCUMENTS

| | | |
|---|---|---|
| DD | 298 849 A5 | 3/1992 |
| DD | 298 850 A5 | 3/1992 |
| DE | 2165315 | 7/1973 |
| DE | 198 31 392 A1 | 2/2000 |
| EP | 1 152 263 A1 | 11/2001 |
| JP | 10253802 A | 9/1998 |
| JP | 11-142606 A | 5/1999 |
| WO | WO 91/08106 A1 | 6/1991 |

OTHER PUBLICATIONS

H. Ganesha Shanbhogue, et al, "Multilayer antireflection coatings for the visible and near–infrared regions", *Applied Optics*, Sep. 1, 1997, vol. 36, Nr. 25, pp. 6339–6351.

* cited by examiner

Primary Examiner—Drew A. Dunn
Assistant Examiner—Joshua L Pritchett (57) ABSTRACT

An optical component with a low reflectance for ultraviolet light in a wavelength range between approx. 180 nm and approx. 370 nm, in particular approx. 248 nm, and for a high angle of incidence up to at least approx. 40° has a substrate and a multilayer antireflection system arranged on at least one surface of said substrate to provide reflection reduction. The multilayer system distinguishes itself in that the layer adjacent to the substrate does not consist of magnesium fluoride and that none of the layers has a thickness of more than half of the working wavelength. In particular, the layer thicknesses of the low refractive materials should not exceed $\frac{1}{3}$ the working wavelength. By adhering to these boundary conditions, antireflective coatings can be produced that provide both permanent laser resistance as well as a high resistance against inner layer stress and thermal stress.

47 Claims, 5 Drawing Sheets

ANTIREFLECTION COATING FOR ULTRAVIOLET LIGHT

The following disclosure is based on German Patent Application 101 01 017.6 filed on Jan. 5, 2001, which is incorporated into this application by reference.

BACKGROUND OF THE INVENTION

1. Field of the Invention

The invention relates to an optical component with a low reflectance for ultraviolet light in a wavelength range between approx. 180 nm and approx. 370 nm for a high angle of incidence, in particular in a range up to at least 40°.

2. Description of the Related Art

In many areas the demand for efficient optical components with a low reflectance for ultraviolet light in a wavelength range between approx. 180 nm and approx. 370 nm is increasing. For example, light within this wavelength range is used in microlithographic systems to produce highly integrated semiconductor components or other microdevices using wafer steppers or wafer scanners, whereby a light source illuminates a mask (reticle) over an illumination optical system, which displays its image onto a semiconductor coated with a photo resist by means of a projection optical system.

Since the efficiency of this technique is defined by the exposure action speed, the aim is to use lenses having the lowest possible loss of light between the light source and the wafer. In so doing, the surfaces of transparent optical elements of the systems are coated with so-called reflection reduction layers, or antireflective layers (AR-layers) to increase their transparency or transmission, respectively. Such antireflective coatings lead to increased transmission as long as the loss of light through absorption and scattering, for example, remains smaller compared to the magnitude of the decrease in reflectance. The decrease in reflectance also serves as prevention against stray light or diffused light that can destroy the imaging properties of high-grade lenses.

As is generally known, multilayer systems with multiple stacked layers made from dielectric materials of varying refraction indices are used that usually have layers of a high refractive material and layers of thereto relatively low refractive material stacked on top of each other.

Particularly in optical systems with a multiplicity of curved lens surfaces and/or such systems in which high optical angles of incidence appear on refractive surfaces due to the high numeric aperture, it is advantageous if the antireflective coating has a homogenous effect on the entire coated surface and for all optical angles of incidence that appear, that typically lie in the range between vertical incidence and an angle of incidence of at least approx. 40°.

Often it is practical for an optical component to be transparent within the ultraviolet range not only in the active wavelength range, which is determined by the type of light source, but also in a wavelength range of visible light, for example, between approx. 500 nm and approx. 700 nm. Synchronous antireflection alleviates mask and substrate alignment for the visible spectrum as well. He—Ne-laser systems with an active wavelength of 633 nm are often used for this purpose.

A two-range antireflective coating for optical elements of a processing laser is shown in German reference DE 198 31 392. The multilayer system designed for an active wavelength of 248 nm consists of nine individual layers, which interchangeably comprise magnesium fluoride as the low reflective material and aluminum oxide as the high refractive material. The first layer adjacent to the substrate in all embodiments consists of magnesium fluoride and the thickness of the magnesium fluoride layer varies inconsistently between approx. 25 nm and approx. 150 nm. These layers are supposed to have good laser resistance. After several years of use, however, fracturing in connection with delamination was observed in magnesium fluoride/aluminum oxide multi layer systems with similar layer arrangement and layer thickness distribution, causing the life spans of such coatings and optical components coated therewith to be limited.

An object of the invention is to provide an antireflective coating for optical components that offers effective antireflection for ultraviolet light in the wavelength range between approx. 180 nm and approx. 370 nm and high angle of incidence ranges up to at least approx. 40°, and that is distinguished by high resistance, in particular under laser beams.

SUMMARY OF THE INVENTION

To solve this and other objects, the invention, according to one formulation, provides an optical component with a low reflectance for ultraviolet light in a wavelength range between approx. 180 nm and approx. 370 nm for a high angles of incidence, which includes:

a substrate having at least one surface;

a multilayer system of multiple stacked layers arranged to the at least one surface of said substrate to provide a reduction of reflection, a layer having a high refractive or a low refractive dielectric material;

a first layer contacting the substrate being substantially free of magnesium fluoride and none of the layers having a layer thickness of more than about (0.5λ), where λ is the working wavelength in the ultraviolet wavelength range.

An antireflective multilayer system according to the invention distinguishes itself in that the first layer adjacent to the substrate is substantially free of magnesium fluoride and that none of the layers has a thickness of more than approx. (0.5λ), whereby λ is the working wavelength in the ultraviolet wavelength range. Therefore, the first layer should neither contain magnesium fluoride nor consist of this material respectively. In any event, any amount of magnesium fluoride present should be so low that the properties of this first layer are not substantially affected by the properties of magnesium fluoride. It is particularly favorable if none of the layers has a layer thickness of more than approx. (0.35λ). The layer thicknesses of the low refractive material have proven to be particularly critical, whereby said material is preferably a fluoride, in particular magnesium fluoride. The layer thickness should not exceed approx. 0.3λ in any of the layers.

The invention and its other advantageous embodiments show that to produce permanently laser-resistant antireflective coatings with the optical properties mentioned initially, it is necessary to choose from theoretically infinite number of optically appropriate multilayer systems those systems that fulfill the given boundary conditions in terms of material selection for the layer adjacent to the substrate and in terms of maximum layer thicknesses. Because of its low refractive index and good workability, commonly used magnesium fluoride, in particular, could be identified as a critical material, which contrary to traditional suggestions should not be used as the first layer adjacent to the substrate. Furthermore, layer thicknesses of this material should be kept as low as possible. As a result, magnesium fluoride has been identified as the "operative weak link" of such coatings. Its negative influence on the resistibility of the antireflective coating can be minimized by means of appropriately thin individual layer thicknesses and lowest possible overall layer thicknesses.

It has turned out that particularly high laser resistance and other types of resistance, for example, resistance towards layer stress that leads to fracturing if the overall layer thickness of the multilayer system totals less than double the active wavelength, in particular less than 1.5λ. The total thickness of the low refractive material layers can be less than the active wavelength and in particular less than half of the active wavelength.

Within the context of the invention it is possible to build multilayer systems that have no more than six individual layers. Because of the fewer number of layers as compared to commonly known multilayer systems of this type, the laser durability of the coating can normally only be improved such that the probability of defects leading to degradation within the multiplicity of layers is less, the fewer the layers that need to be arranged. Such flaws that minimize laser durability may be impurities, defects or enclosures that increase local absorption and can lead to uneven beam exposure of the layer. Reducing the number of layers also simplifies the process, which can decrease costs for supplying coated optical elements.

It has become furthermore evident that it is advantageous if the ratio between the sum of the layer thicknesses of the low refractive material layers and the sum of the layer thicknesses of the high refractive material layers lies below approx. 1.5, in particular below approx. 1.2. This may well positively counteract the buildup of thermal stress within the layer system and between the layer system and substrate, as well as inner layer stress.

Beyond the claims, the aforementioned and further characteristics emanate from the description and the drawings as well, whereby the specific characteristics may be realized individually or in groups in the form of sub-combinations in an embodiment of the invention and in other areas and may represent embodiments that are favorable and independently protectable.

Example embodiments of the invention are illustrated in the drawings and explained in more detail below.

DETAILED DESCRIPTION OF THE PREFERRED EMBODIMENTS

Figure 1:
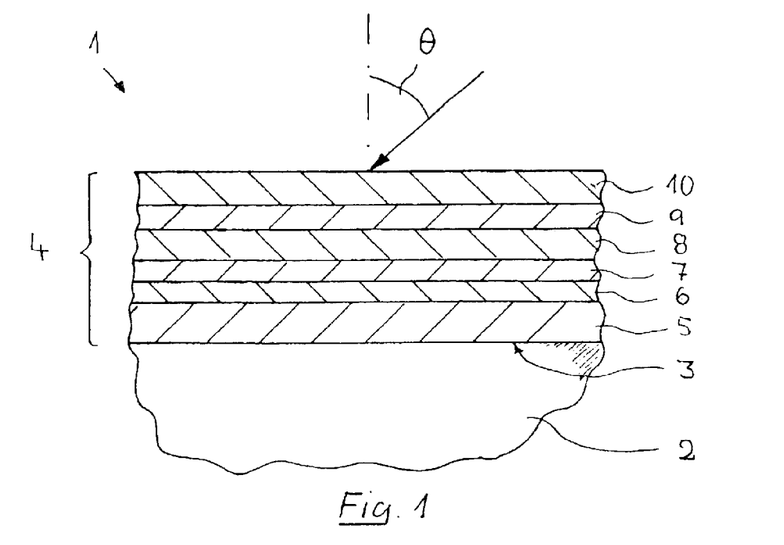
FIG. 1 is a schematic cross-section through an embodiment of a multilayer antireflective coating according to the invention with six layers arranged on a substrate made of synthetic quartz for decreasing reflection in a wavelength of 248 nm and within the visible spectral range.

A schematic cross-section of the surface area of an optical component 1 is shown in FIG. 1 that has a substrate 2 made from a material transparent for ultraviolet light with a wavelength of approx. 248 nm. A multilayer antireflective coating 4 with six stacked layers 5 through 10 is arranged to reduce reflection onto the curved surface 3 shown, which can be a biconvex lens, for example.

The substrate 2 consists of a high-purity synthetic quartz glass, which can be obtained under the name "Suprasil" and which has a refraction index of n=1.5 in the wavelength of λ=248 observed here. In other embodiments, the substrate can also consist of a crystalline substance, in particular a fluoride like calcium fluoride. The first layer 5, which is directly applied to the surface 3 consists substantially of aluminum oxide ($Al_2O_3$), which has a higher refraction index in the active wavelength of approx. n=1.69 compared to the substrate. The high refractive layer 5 adjacent to the substrate has a layer thickness of approx. 64.2 mn or approx. 0.26λ respectively, and is the thickest individual layer of the multilayer system 4. The second layer 6, which is stacked thereupon, consists substantially of magnesium fluoride ($MgF_2$), which compared to the first layer and the substrate 2 has a low refraction index of approx. n=1.41. With a layer thickness of approx. 10 nm, this layer is very thin. The layers 7, 8, 9, 10 stacked thereupon are, in this order, aluminum oxide (13.4 nm) magnesium fluoride (37.2 nm), aluminum oxide (30.5 nm), and magnesium fluoride (52.1 nm).

The following short notation is used to characterize this layer design:

$$S|64.2/A|10.0/M|13.4/A|37.2/M|30.5/A|52.1/M| \qquad (1)$$

In this notation, "S" refers to the substrate, a vertical line (|) refers to an interface and the indication 64.2/A refers to an aluminum oxide layer (A) with a layer thickness of 64.2 nm. The letter "M" stands for magnesium fluoride.

It should be noted that none of the layers 5 through 10 has a layer thickness of more than approx. 65 nm (or 0.26λ respectively); that the thickest individual magnesium fluoride layer (outer layer 10) is only approx. 52.1 nm (approx. 0.21λ) thick; and that a metal oxide, namely aluminum oxide, forms the layer adjacent to the substrate. The total thickness of the multilayer configuration 4 lies below the active wavelength at approx. 207 nm and amounts to only approx. 0.83λ. This overall very thin coating 4 is constructed in almost equal thicknesses on sections of high refractive material and low refracted material, whereby the ratio between the sums of the layer thicknesses of the low refractive material layers and the sum of the layer thicknesses 5, 7, 9 of the high refractive material layers at approx. 0.92 is close to a value of 1, which represents an equal distribution.

The layers shown in FIG. 1 and all subsequent examples are arranged in a vacuum onto the substrate 2 in a relatively known manner by physical vapor deposition (PVD). Any other suitable technique may also be used for layering.

Figure 2:
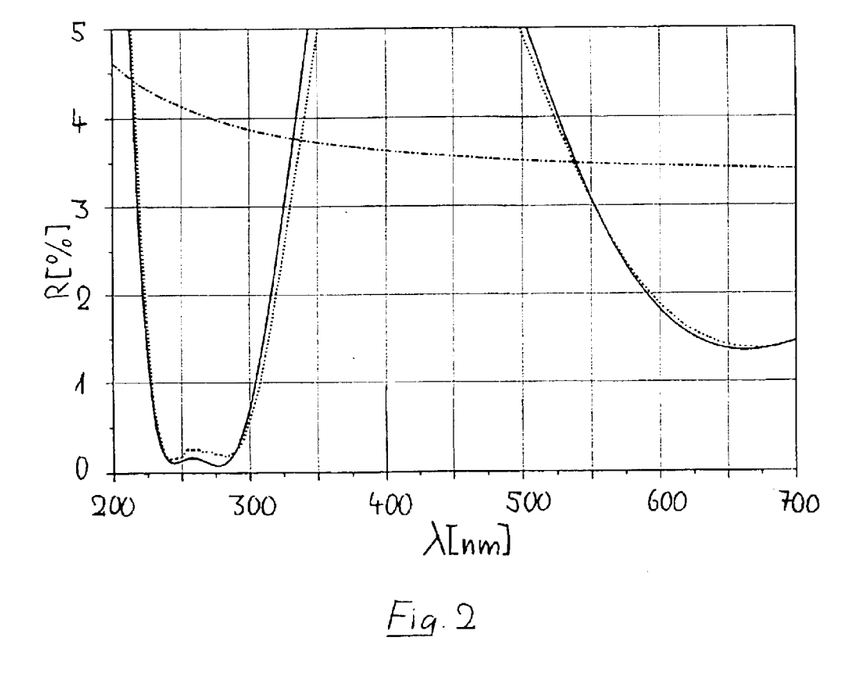
FIG. 2 is a graph showing calculated and measured values for the degree of reflectance of the multilayer system shown in FIG. 1 as the function of the wavelength for vertical light incidence.

Substantial optical properties of the six-layer antireflection coating shown in FIG. 1 are explained by means of the graph in FIG. 2. This graph shows the degree of reflectance R (in percent) of the layer system shown in FIG. 1 in dependence of the wavelength λ of the incident electromagnetic beam at almost vertical light incidence, whereby the wavelength range shown comprises both the range of deep ultraviolet light (DUV) below approx. 400 nm as well as the range of visible light with larger wavelengths. The chain-dotted line represents the calculated degree of reflectance of an uncoated substrate, the solid line represents the calculated degree of reflectance of the multilayer coating of FIG. 1, and the dotted line represents the corresponding measured values of the degree of reflectance of the multiple coating above.

It should be noted that the six-fold layer achieves effective antireflection in the active wavelength range at 248 nm, through which the degree of reflectance in the range of approx. 235 nm and approx. 292 nm is reduced in a broadband range to values below approx. 0.3% in the active wavelength. This corresponds to a bandwidth of approx. 1.24, whereby the bandwidth defines the wavelength ratio between the long wave and short wave limit of the range in which the degree of reflectance lies below approx. 0.3%. In addition, effective antireflection or transmission increase respectively results in the wavelength range of between approx. 600 nm and approx. 800 nm, where the degree of reflectance is reduced by approx. half or to less than 2% respectively compared to the uncoated substrate. This two-range effect can facilitate the alignment between reticle and wafer during exposure since active alignment devices using visible light (approx. 633 nm) that beam through the optical elements can be used here without resulting in imprecision due to transmission losses and/or flares or ghost respectively.

Figure 3:
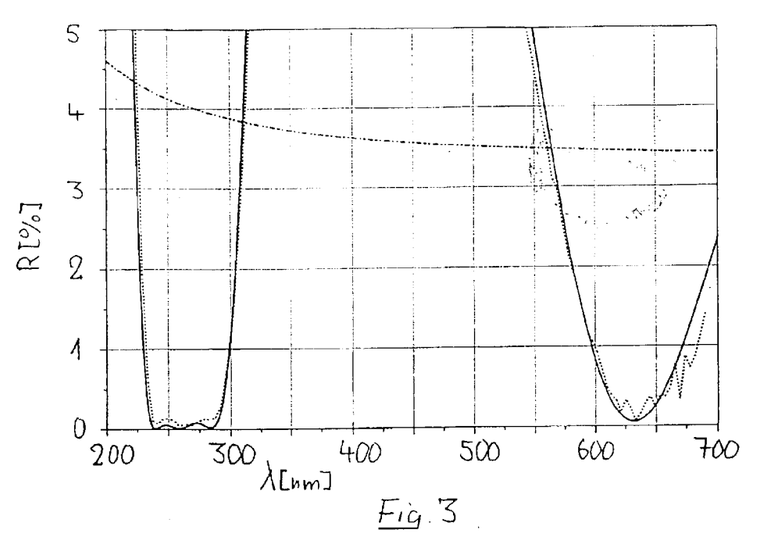
FIG. 3 is a graph showing calculated and measured values for the degree of reflectance as the function of the wavelength for vertical light incidence for another multilayer system with ten individual layers.

It is explained in FIG. 3 that, if needed, coatings according to the invention may also effect further reduction of reflection in both wavelength ranges indicated. For example, a multilayer system with ten individual layers is described that interchangeably comprises aluminum oxide and magnesium fluoride. The layer system can be characterized with the notation above as follows:

S|76.5/A|11.0/M|18.0/A|23.4/M|15.7/A|70.0/M|73.0/A|47.7/M|

37.2/A|45.8/M|                                        (2)

The layer adjacent to the substrate again consists of aluminum oxide in this layer with a total thickness of approx. 418 nm. The thickest individual magnesium fluoride layer has a layer thickness of approx. 70.0 nm and is situated approx. in the middle of the layer stack. The ratio of the sum of the low refractive material and high refractive material layer thicknesses is approx. 0.9.

The substantial difference with the embodiment shown in FIG. 1 thereby lies in the addition of four more layers to the layer count, which results in larger overall thickness. It is evident from FIG. 3 that the degree of reflectance in the active wavelength range between approx. 235 nm and approx. 290 nm can be reduced to residual reflections of less than 0.2%. Moreover, in comparison to the six-fold layer (FIG. 1), the result is a larger bandwidth of antireflection that totals approx. 1.25 in the example (bandwidth is defined here as the ratio of the long wave limit to the short wave limit of the active antireflection range with degrees of reflectance below 0.3%). This bandwidth is advantageous for among other reasons since it supports relatively efficient optical output up to high angles of incidence. In addition, efficient homogeneous optical output is yielded on substrates up to a certain inhomogeneity of the thicknesses of the individual layers on the substrate, which, for example, may move to the edge of a lens surface due to layer thickness decay. Even in the visible spectral ranges antireflection is more effective compared to the six-fold layer (FIGS. 1 and 2), whereby in the range between 600 nm and 670 nm the residual degree of reflectance is reduced to values below 1%.

Figure 4:
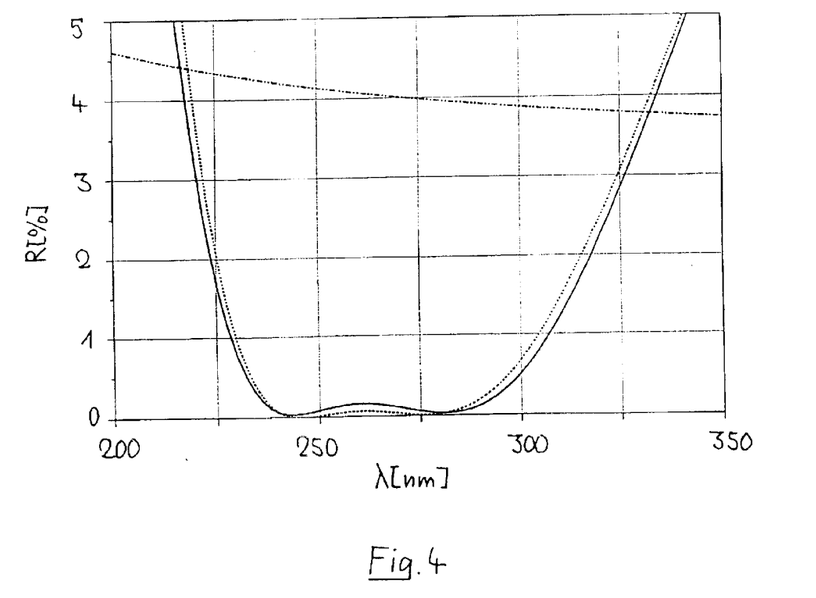
FIGS. 4 and 5 are graphs showing calculated and measured values for the degree of reflectance (FIG. 4), or the corresponding degree of transmission (FIG. 5) respectively, as the function of the wavelength for the vertical light incidence for a multilayer system with six individual layers.
Figure 5:
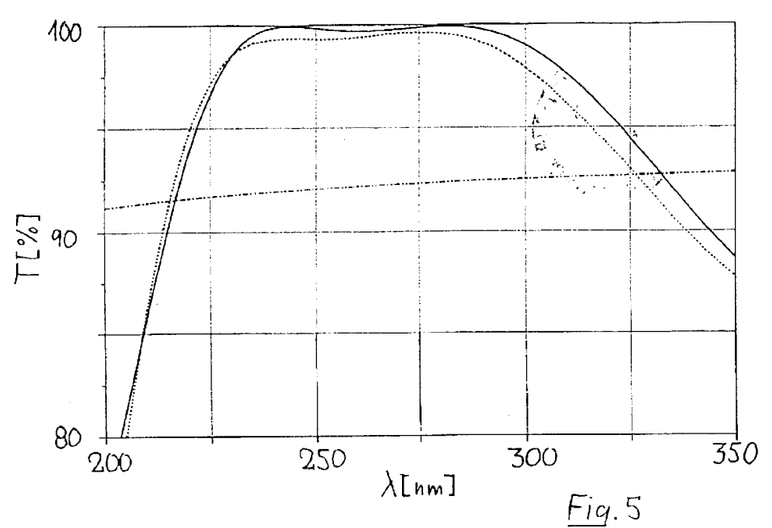
Figure 6:
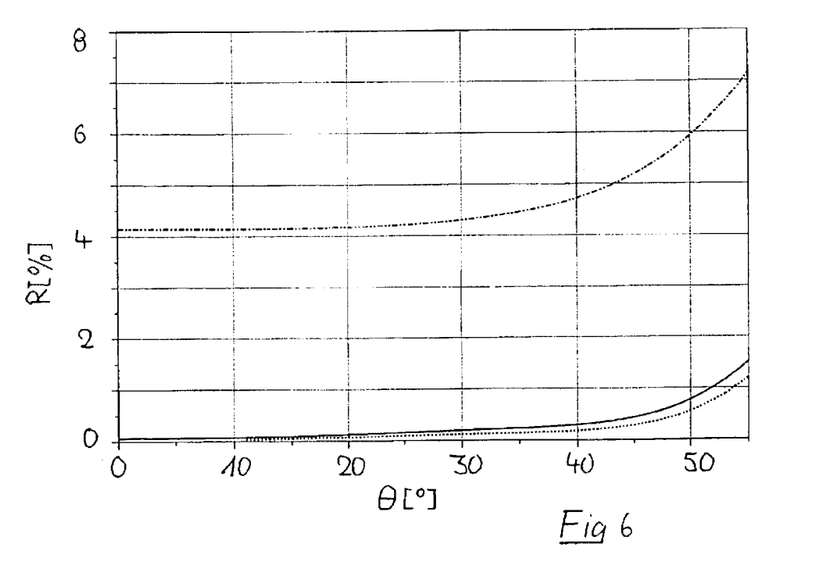
FIG. 6 is a graph showing calculated and measured values for the degree of reflectance in an active wavelength of 248 nm as the function of the angle of incidence θ for the six layer system of FIG. 4 and FIG. 5.

FIGS. 4 through 6 illustrate a further example of a multiple layer coating according to the invention with six individual layers that is particularly beneficial to use if transmission increase within the range of visible light is not necessary. This example is characterized with the above notation as follows:

S|45.3/A|13.2/M|15.6/A|50.8/M|38.9/A|46.3/M              (3)

This flat layer system has an overall thickness of approx. 210 nm, which is less than the active wavelength. The thickest individual magnesium fluoride layer lies somewhere in the middle of the layer stack and has a layer thickness of 50.8 nm, which corresponds to approx. 0.2λ. The layer adjacent to the substrate again consists of aluminum oxide. The ratio between the sums of the thicknesses of the low refractive and high refractive material layers is approx. 1.1, so the ratios are reversed from the layers of FIGS. 1 and 2.

FIGS. 4-6 illustrate the optical properties of the six-layer system: the chain-dotted lines show the values for an uncoated substrate while the straight line represents the calculated values and the dotted line represents the measured values for degree of reflectance or degree of transmission respectively. The transmission values (FIG. 5) apply to a substrate coated on both sides, in which both the light entry surface as well as the light exit surface is coated. FIG. 4 shows that the degree of reflectance in the range of approx. 235 nm and approx. 290 nm is reduced in a broadband range to values below approx. 0.2% residual reflectance. Such a reduction in reflectance occurs essentially without absorption or scattering, so that the degree of transmission in this wavelength range continuously attains values of about 99% or better. Accordingly, high-strength-of-light optical systems can be constructed with lenses or other transparent optical elements (for example prisms, plates, etc.) coated with the inventive coating.

From FIG. 6 it is evident that such superior optical properties are attained not only with vertical or almost vertical light penetration through the optical elements, but homogeneously over a large angle of incidence between 0° and at least approx. 40°. The angle of incidence θ is usually defined here as an angle between the vertical angle on the light entry surface and the incident light direction. Consequently, antireflective coatings with a homogeneous effect on the entire (curved) lens surface and for a large optical angle range of incidence prevalent in practical applications are produced. It should be pointed out that the degree of reflectance in the range between 0°<θ<40° is less than approx. 0.3% and that in the range up to θ=50° it also remains significantly below residual reflection of 1%.

Figure 7:
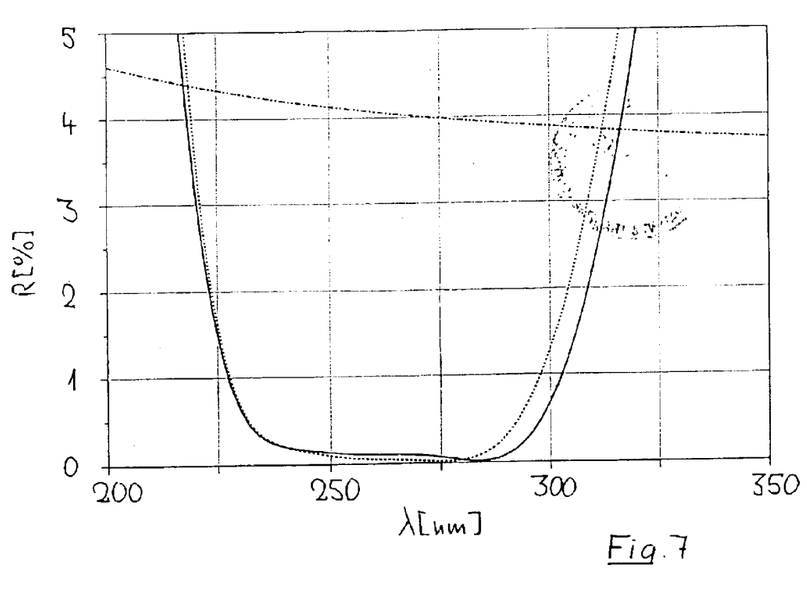
FIG. 7 is a graph showing calculated and measured values of the degree of reflectance as the function of the wavelength for vertical light incidence for another multilayer system with six layers.
Figure 8:
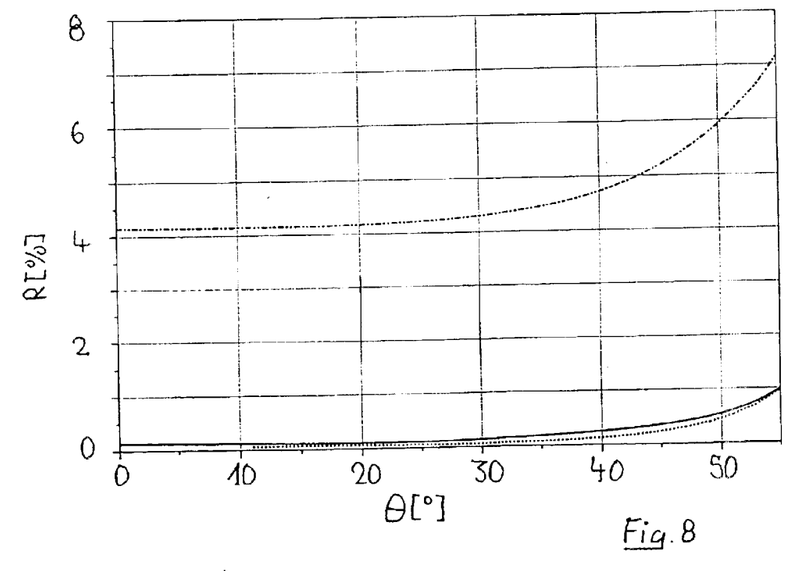
FIG. 8 is a graph showing calculated and measured values for the degree of reflectance as the function of the angle of incidence θ for the six layer system of FIG. 7 and a wavelength of 248 nm.

In FIGS. 7 and 8, essential optical properties of another embodiment of a multilayer system with six layers is described, which is characterized using the notation from above as follows:

S|70.7/A|58.4/M|66.4/A|57.0/M|36.3/A|45.9/M|             (4)

Similar to the embodiment of FIG. 3, the absolute thickest layer is the aluminum oxide layer adjacent to the substrate with a layer thickness of 70.7 nm, followed by the thickest individual magnesium fluoride layer with a thickness of 58.4 nm. The ratio of the sums of the thicknesses of low refractive and high refractive materials is approx. 0.93 here and the overall thickness of the multilayer coating is 335 nm, which corresponds to approx. 1.35λ. This layer system has very similar optical properties to the one of FIGS. 4 through 6. The wavelength range of active antireflection lies between approx. 235 and approx. 290 nm here, which corresponds to a bandwidth of approx. 1.23. Residual reflectance lies primarily below 0.2% in this range. This effective antireflection extends over an even further angle range compared to the embodiment of FIGS. 4 through 6, whereby the degree of residual reflection between $0°<\theta<40°$ lies below approx. 0.3% and even at $\theta=50°$, lies still below approx. 0.5%.

The invention was described here by means of several examples that explain that multilayer antireflection coatings can be created within the context of the invention defined in the claims that fulfill the most extreme challenges in terms of reflection reduction in the active wavelength range of $\lambda=248$ nm, in particular in the range between approx. 235 mn and 295 nm, and if necessary in the range of visible light as well. Since antireflection is attained over a high range of angle of incidence up to at least 40° or even 50°, optical elements coated according to the invention, for example lenses, can be used especially in high aperture optic systems where high optical angles of incidence from this range may occur. Lens surfaces with relatively strong curvature can be provided with an antireflection coating that have a homogeneous effect over the entire lens surface. Fracturing and subsequent delamination as well as other long-term degradations of the coating caused by high-energy beams are effectively avoided through the compactness of the whole layer and by avoiding high individual layer thicknesses of, in particular, magnesium fluoride, as well as by avoiding magnesium fluoride as the first layer adjacent to the substrate.

By slightly adjusting the thicknesses of the individual layers (for customization to other substrate refractive indices) the layer designs (coating design) indicated can also be effective on other substrate materials, like calcium fluoride or barium fluoride, with essentially the same optical layer properties.

Figure 9:
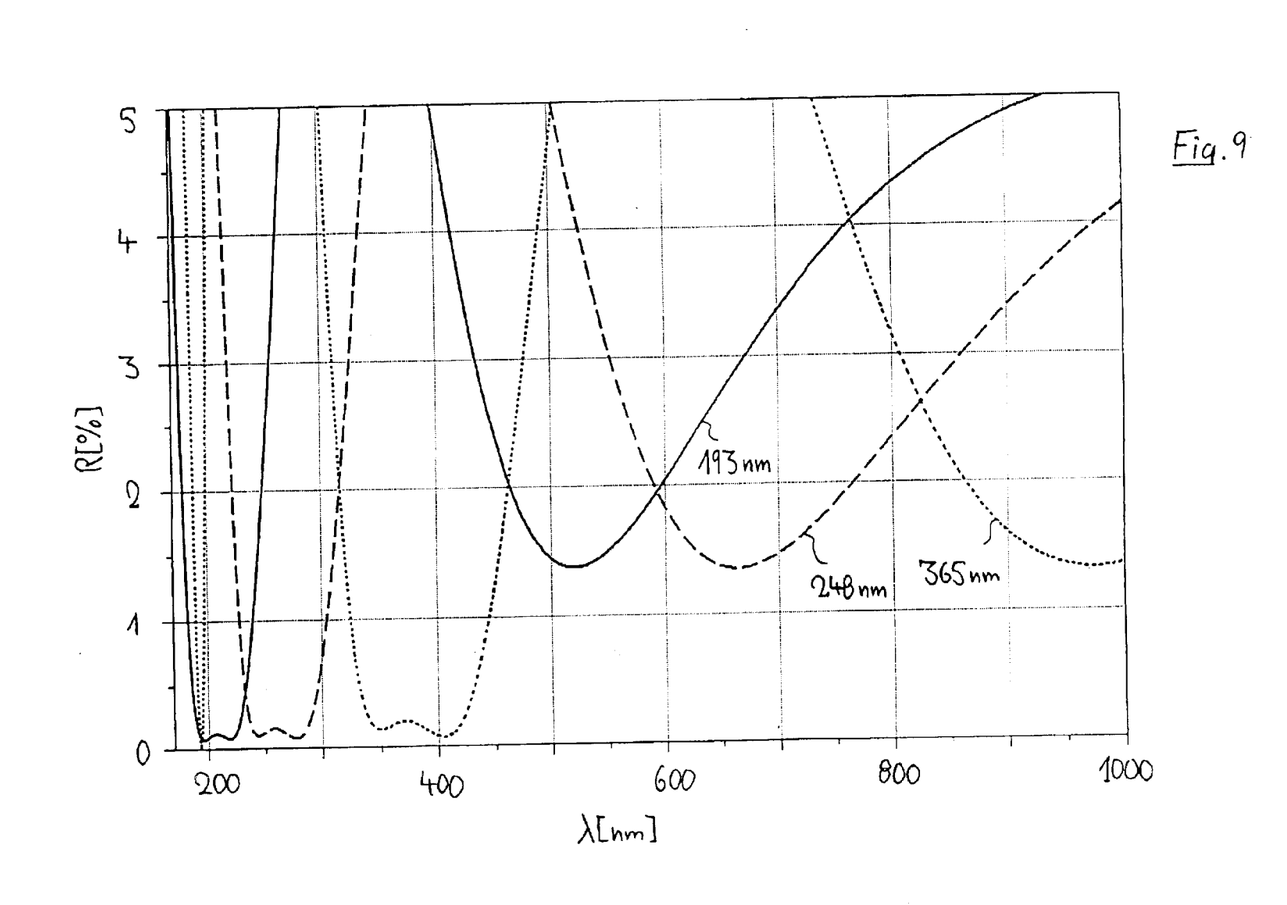
FIG. 9 is a graph showing the calculated values for the degree of reflectance of three equivalent multilayer systems as the function of the wavelength for various active wavelengths (193 nm, 248 nm, and 365 nm).

FIG. 9 is used to explain that the layer designs, which up until now were explained using layers for a 248 nm active wavelength, are useful also for other active wavelengths without substantial alterations in terms of the specific optical wavelength properties. The six-fold layer described initially is chosen as an example, the optical properties of which are shown for an active wavelength of 248 nm in FIG. 2. This curve in the degree of reflection over the wavelength corresponds to the dash-lined curve in FIG. 9. Indicating the individual layer thicknesses as fractions of the active wavelength produces the following layer design which is an approximation for the layer design in (1):

$$S|(0.26\lambda)/A|0.04\lambda/M|(0.05\lambda)/A|(0.15\lambda)/M|(0.12\lambda)/M| \quad (5)$$

The absolute layer thicknesses of individual layers for other active wavelengths can be attained from this wavelength-based notation by plugging in the corresponding active wavelength. For example, the geometric layer thicknesses of the equivalent layer system for 193 nm or 365 nm can be attained based on the layer design of (1) by multiplying the geometric layer thicknesses given in (1) by the factor 193/248 or 365/248 respectively. In all cases, the substrate material is synthetic quartz of the commercial brand Suprasil.

Besides the curve already known from FIG. 2 for 248 nm (dashed line in FIG. 9), the optical properties of the equivalent proportionately scaled multilayer systems for the active wavelength 193 nm (straight line) and 365 nm (dotted line) are shown in FIG. 9. It is evident that with thinner layers proportionately at 193 nm the minimum reflectivity is offset to the short wave range in the range of 200 nm, whereby the residual degree of reflectance of the active wavelength 193 nm lies below approx. 0.2%. While the absolute width of the minimum (distance between long wave and short wave limits) decreases proportionately to the wavelength reduction, the bandwidth (the ratio between the long wave and short wave limit of the range with a residual reflectance degree below 0.3%) remains virtually unchanged. The minimum within the visible light range is offset to a shorter wavelength, ending up at approx. 520 nm to 530 nm, whereby in total the degree of reflection between approx. 470 nm and approx. 600 nm is below approx. 2%.

A slight reflectance decrease to less than 3% residual reflection is possible at 633 nm compared to uncoated substrates.

By increasing the active wavelength to 365 nm and proportionately increasing the geometric layer thicknesses according to (5), the broadband range of sharp decrease of reflectance in ultraviolet light is offset to longer wavelengths, whereby a residual degree of reflectance of less than 0.3% in turn is attained at the active wavelength 365 nm. This beneficial value is in a broadband range that has an absolute width larger than that of the thinner layers, whereby the ratio between long wave and short wave limit defined here as broadband remains essentially constant, however. The reflection minimum in the visible range is significantly offset to long wavelengths and is now at approx. 950 nm.

The examples show that optical components with low degree of reflectance for ultraviolet light in a wavelength range between approx. 180 nm and approx. 370 nm coated with the coating of the invention are indeed producible. Consequently, large wavelength ranges of laser wavelengths often used nowadays can be used in the microlithography sector. In an optical respect, the special characteristics of the coatings are primarily the extensive and extraordinary decrease of reflectance in a broadband range within the range of the respective active wavelength. Subsequently, the layers are relatively tolerant against slight process-related variations in layer thicknesses and can be used for more curved surfaces as well with sufficient efficiency. In addition, active decrease of reflection in the range of visible light also occurs where necessary. By avoiding larger thicknesses of layers containing magnesium fluoride that are too large, particularly resistant coatings are possible that are particularly resistant.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all changes and modifications as fall within the spirit and scope of the invention, as defined by the appended claims, and equivalents thereof.

What is claimed is:

1. An optical component with a low reflectance for ultraviolet light in a wavelength range between approx. 180 nm and approx. 370 nm for high angles of incidence, comprising:

a substrate having at least one surface;

a multilayer system of at least six stacked layers arranged to the at least one surface of the substrate to provide a reduction of reflection, each of the layers comprising a high refractive or a low refractive dielectric material; wherein:

only one high refractive material and only one low refractive material are used;

the low refractive material consists substantially of magnesium fluoride and the high refractive material consists substantially of aluminum oxide;

a first layer contacting the substrate consists substantially of aluminum oxide;

a second layer contacting the first layer has an optical thickness equal to or less than (0.33λ), where λ is the working wavelength in the ultraviolet wavelength range; and none of the layers has a geometrical layer thickness of more than about (0.5λ).

2. An optical component according to claim 1, wherein none of the layers has a geometrical layer thickness of more than about (0.35λ).

3. An optical component according to claim 1, wherein none of the layers has an optical layer thickness of more than about (0.52λ).

4. An optical component according to claim 1, wherein the first layer has an optical thickness in a range from (0.31λ) through (0.52λ).

5. An optical component according to claim 1, wherein the second layer contacting the first layer has an optical thickness equal to or less than (0.1λ).

6. An optical component according to claim 1, wherein the second layer contacting the first layer is the layer with the smallest optical thickness.

7. An optical component according to claim 1, wherein a third layer contacting the second layer has an optical thickness equal to or less than (0.12λ).

8. An optical component according to claim 1, wherein none of the low refractive material layers has a geometrical layer thickness of more than about 70 nm.

9. An optical component according to claim 1, wherein the overall geometrical thickness of the multilayer system amounts to less than (2λ).

10. An optical component according to claim 1, wherein the overall geometrical thickness of the low refractive material layers amounts to less than λ.

11. An optical component according to claim 1, wherein the multilayer system has no more than six layers.

12. An optical component according to claim 1, wherein a ratio between the sum of the geometrical layer thicknesses of the low refractive material layers and the sum of the geometrical layer thicknesses of the high refractive material is below approx. 1.5.

13. An optical component according to claim 1, providing low reflectance in a wavelength range of visible light, wherein the reflectance between approx. 600 nm and approx. 700 nm is less than approx. 2%.

14. An optical component according to claim 1, wherein the reflectance of the optical component is less than approx. 1% in an incident angle range between 0° and 50°.

15. An optical component according to claim 1, wherein the substrate is made of one of fused silica glass and a crystalline fluoride.

16. An optical component according to claim 1, being designed for a working wavelength of about λ=248 nm.

17. An optical component according to claim 1, wherein the reflectance within the working wavelength range covers a bandwidth of more than 1.1 below a given reflectance, wherein the bandwidth is the ratio between the wavelengths of the long-wave limit and the short-wave limit of the wavelength range, in which the reflectance lies below 0.3%.

18. An optical component according to claim 1, wherein the overall geometrical thickness of the low refractive material layers amounts to less than (0.5λ).

19. An optical component according to claim 1, wherein a ratio between the sum of the geometrical layer thicknesses of the low refractive material layers and the sum of the geometrical layer thicknesses of the high refractive material is below approx. 1.2.

20. An optical component according to claim 1, providing low reflectance in a wavelength range of visible light, wherein the reflectance between approx. 600 nm and approx. 700 nm is less than approx. 1%.

21. An optical component according to claim 1, wherein the reflectance of the optical component is less than approx. 1% in an incident angle range between 0° and 40°.

22. An optical component according to claim 1, wherein the reflectance of the optical component is less than approx. 0.5% in an incident angle range between 0° and 50°.

23. An optical component according to claim 1, wherein the reflectance of the optical component is less than approx. 0.5% in an incident angle range between 0° and 40°.

24. An optical component with a low reflectance for ultraviolet light in a wavelength range between approx. 180 nm and approx. 370 nm for high angles of incidence, comprising:

a substrate having at least one surface;

a multilayer system of multiple stacked layers arranged to the at least one surface of the substrate to provide a reduction of reflection, each of the layers comprising a high refractive or a low refractive dielectric material, a first layer contacting the substrate consisting substantially of a high refractive metal oxide;

a second layer contacting the first layer having an optical thickness equal to or less than (0.1λ), where λ is the working wavelength in the ultraviolet wavelength range;

a third layer contacting the second layer having an optical thickness equal to or less than (0.12λ); and none of the layers having a geometric layer thickness of more than about (0.35λ).

25. An optical component according to claim 24, wherein the second layer contacting the first layer is the layer with the smallest optical thickness.

26. An optical component according to claim 24, wherein only one high refractive material and only one low refractive material are used.

27. An optical component according to claim 24, wherein the low refractive material consists substantially of at least one of a fluoride and magnesium fluoride.

28. An optical component according to claim 24, wherein the high refractive material consists substantially of aluminum oxide.

29. An optical component according to claim 24, wherein the multilayer system has at least six multiple stacked layers.

30. An optical component according to claim 24, wherein none of the low refractive material layers has a geometrical layer thickness of more than about 70 nm.

31. An optical component according to claim 24, wherein the overall geometrical thickness of the multilayer system amounts to less than (2λ).

32. An optical component according to claim 24, wherein the overall geometrical thickness of the low refractive material layers amounts to less than λ.

33. An optical component according to claim 24, wherein the multilayer system has no more than six layers.

34. An optical component according to claim 24, wherein a ratio between the sum of the layer thicknesses of the low refractive material layers and the sum of the layer thicknesses of the high refractive material is below approx. 1.5.

35. An optical component according to claim 24, providing low reflectance in a wavelength range of visible light, wherein the reflectance between approx. 600 nm and approx. 700 nm is less than approx. 2%.

36. An optical component according to claim 24, wherein the reflectance of the optical component is less than approx. 1% in an incident angle range between 0° and 50°.

37. An optical component according to claim 24, wherein the substrate is made of one of fused silica glass and a crystalline fluoride.

38. An optical component according to claim 24, being designed for a working wavelength of about $\lambda$=248 nm.

39. An optical component according to claim 24, wherein the reflectance within the working wavelength range covers a bandwidth of more than 1.1 below a given reflectance, wherein the bandwidth is the ratio between the wavelengths of the long-wave limit and the short-wave limit of the wavelength range, in which the reflectance lies below 0.3%.

40. An optical component according to claim 24, wherein the overall geometrical thickness of the low refractive material layers amounts to less than (0.5$\lambda$).

41. An optical component according to claim 24, wherein a ratio between the sum of the layer thicknesses of the low refractive material layers and the sum of the layer thicknesses of the high refractive material is below approx. 1.2.

42. An optical component according to claim 24, providing low reflectance in a wavelength range of visible light, wherein the reflectance between approx. 600 nm and approx. 700 nm is less than approx. 1%.

43. An optical component according to claim 24, wherein the reflectance of the optical component is less than approx. 1% in an incident angle range between 0° and 40°.

44. An optical component according to claim 24, wherein the reflectance of the optical component is less than approx. 0.5% in an incident angle range between 0° and 50°.

45. An optical component according to claim 24, wherein the reflectance of the optical component is less than approx. 0.5% in an incident angle range between 0° and 40°.

46. An optical component with a low reflectance for ultraviolet light in a wavelength range between approx. 180 nm and approx. 370 nm for high angles of incidence, comprising:
   a substrate having at least one surface;
   a multilayer system of at least six stacked layers arranged to the at least one surface of the substrate to provide a reduction of reflection;
   wherein:
   a first layer contacting the substrate consists substantially of aluminum oxide and has an optical thickness equal to or less than about (0.5$\lambda$);
   a second layer contacting the first layer consists substantially of magnesium fluoride and has an optical thickness equal to or less than about (0.33$\lambda$), where $\lambda$ is the working wavelength in the ultraviolet wavelength range; and
   remaining layers alternate between consisting substantially of aluminum oxide and magnesium fluoride and have respective optical thicknesses equal to or less than about (0.5$\lambda$).

47. An optical component according to claim 46, wherein the remaining layers have respective optical thicknesses equal to or less than about (0.3$\lambda$).

\* \* \* \* \*